(No Model.)
T. E. STANLEY & C. D. GULLEY.
DEVICE FOR TRANSPLANTING TREES.
No. 388,154. Patented Aug. 21, 1888.
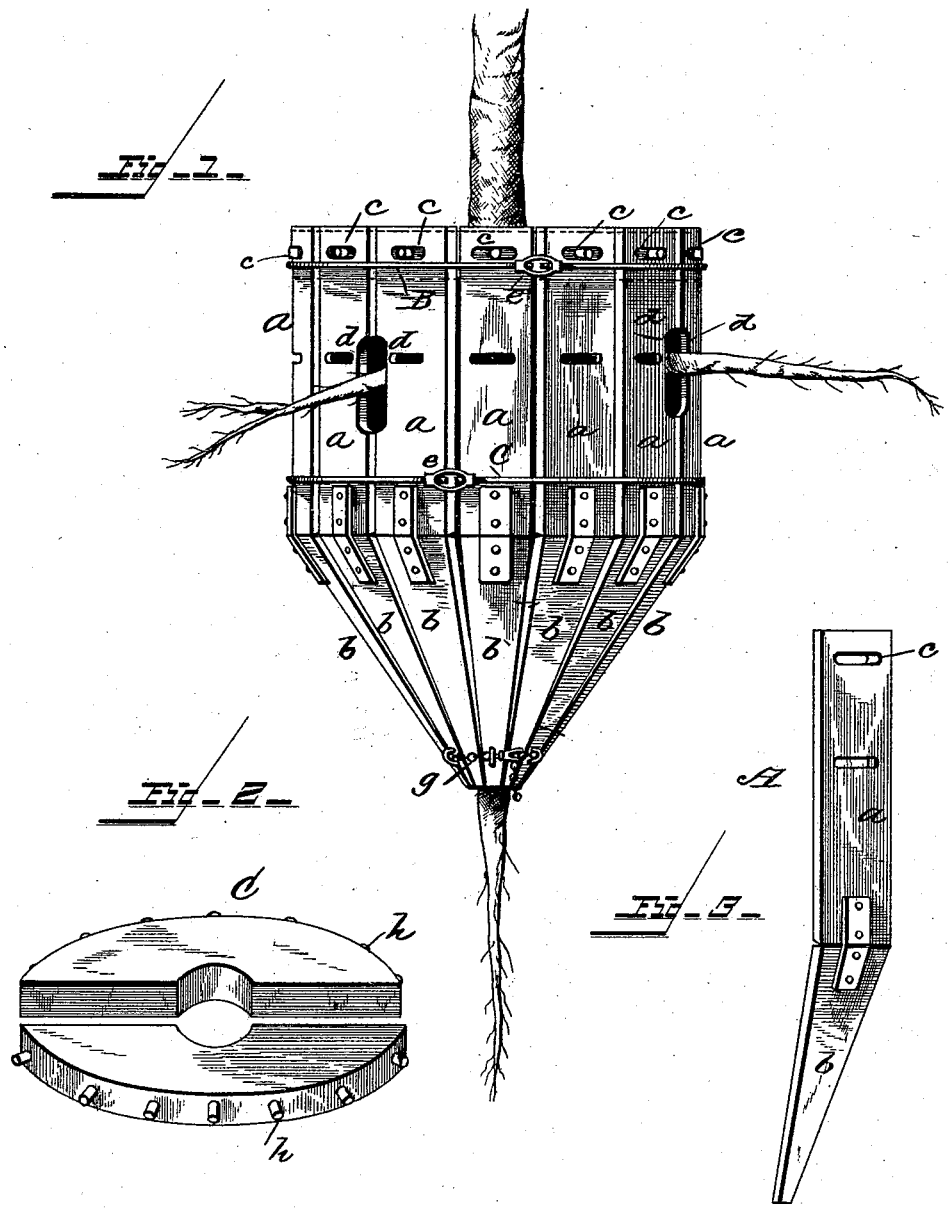
Witnesses.
Albert Speiden
Wm B Burnett
Inventors.
Thomas E. Stanley,
Calvin D. Gulley,
By their Attorney.
Chas. N. Fowler.

United States Patent Office.

THOMAS E. STANLEY AND CALVIN D. GULLEY, OF FORT WORTH, TEXAS.

DEVICE FOR TRANSPLANTING TREES.

SPECIFICATION forming part of Letters Patent No. 388,154, dated August 21, 1888.

Application filed May 29, 1888. Serial No. 275,448. (No model.)

*To all whom it may concern:*

Be it known that we, THOMAS E. STANLEY and CALVIN D. GULLEY, citizens of the United States, residing at Fort Worth, in the county of Tarrant and State of Texas, have invented certain new and useful Improvements in a Device for Transplanting Trees; and we do hereby declare that the following is a full, clear, and exact description of the same, reference being had to the annexed drawings, making a part of this specification, and to the letters and figures of reference marked thereon.

Figure 1 of the drawings is an elevation of our invention showing its application to a tree; Fig. 2, a detail view, in perspective, of the sectional head; and Fig. 3 a similar view of one of the staves.

The present invention has for its object to provide a simple and effective means for transplanting trees; and it consists in the several details of construction substantially as shown in the drawings, and hereinafter described and claimed.

In the accompanying drawings, A represents a series of staves consisting of two hinged sections, $a$ $b$, the lower one of said sections being tapering, as shown, so that when together around the tree they will form a cone. The stave-sections $a$ are provided with transverse elongated slots $c$, and are recessed on their edges, as shown at $d$, so that when together elongated openings will be formed for the roots of the tree to pass. Provision may be made for any number of these openings, as found most desirable. The stave-sections $a$ are held together by wire hoops B C, which are screw-threaded at their ends, as shown, to engage with a take-up nut, $e$, and the lower ends of the stave sections $b$ are held together by a suitable fastening, $g$, or any well known means may be employed, as found most practicable. A sectional head, C, is employed, as shown in Fig. 2, which is placed around the tree above the surface of the ground, and pins $h$, which extend around the edges thereof, pass through the slots $c$ in the stave-sections $a$.

In using the device the earth is first dug around the tree and then the sectional head C placed around the tree above the surface of the ground. The stave-sections $a$ are next hooked over the pins or spikes $h$ and the stave-sections tightly held together by means of the wire hoops, and the lower ends of the stave-sections $b$ secured by the chain $g$ or other preferred means.

The elongated slots $c$ are for the purpose of admitting the lateral adjustment of the stave-sections $a$, to increase the width of the slots formed by the recessed edges of the sections, as shown at $d$, to adapt them to larger roots.

It is not necessary that the two stave sections be connected together by hinges, as simple strap-iron will answer the same purpose—viz., to allow the stave-sections to be pressed inwardly toward a common center, which would answer the same purpose as hinges, and, in fact, if the staves were made of sheet metal, the necessity of making them in sections and hinging them would not be necessary. The stave sections $a$ may be provided with a second slot some distance below it, or two or more may be used, thereby enabling the sectional head C to be connected to the stave sections any distance below the top, to adapt the device in transplanting smaller trees or trees of varying size. The device retains the earth around the root of the tree and preserves the roots, so that in raising it out of the ground the tree is not injured.

Having now fully described our invention, what we claim as new, and desire to secure by Letters Patent, is—

In a device for transplanting trees, the combination, with a suitable head having pins or spikes around its edge, of a series of staves having transverse slots, with which the pins engage, and recessed on their edges to form openings for the roots to pass, and means for holding the staves together, substantially as and for the purpose set forth.

In testimony that we claim the above we have hereunto subscribed our names in the presence of two witnesses.

THOMAS E. STANLEY.
CALVIN D. GULLEY.

Witnesses:
J. B. COBB,
T. O. EVANS.